April 3, 1962 D. J. FRENCH 3,028,177
HITCH MECHANISM
Filed April 4, 1961
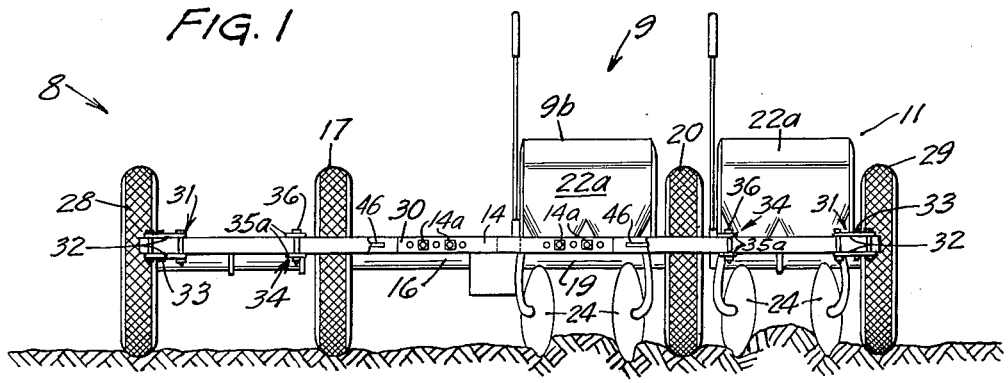
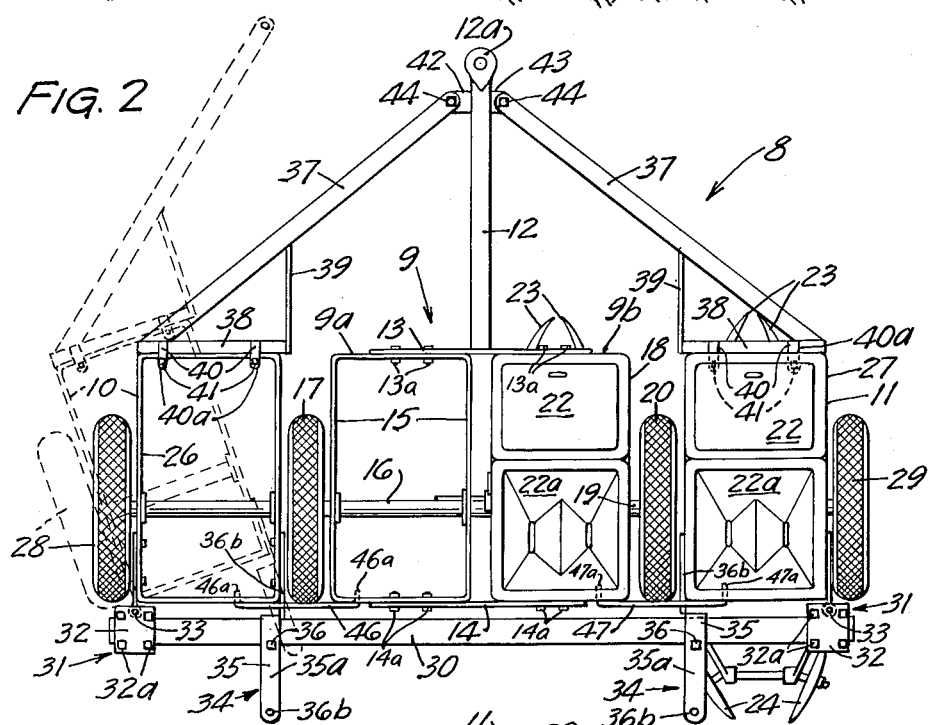
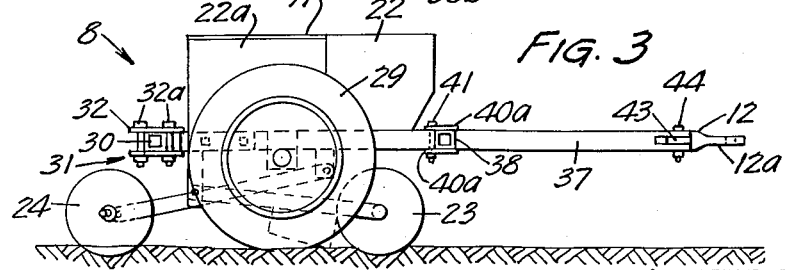
INVENTOR
DAMAS J. FRENCH
BY
Williamson + Palmatier
ATTORNEYS

… … …

United States Patent Office 3,028,177
Patented Apr. 3, 1962

3,028,177
HITCH MECHANISM
Damas J. French, 1711 1st Ave. N.,
Grand Forks, N. Dak.
Filed Apr. 4, 1961, Ser. No. 100,754
6 Claims. (Cl. 280—411)

The invention relates to a hitch mechanism associated with multiple unit vehicles and more particularly to hitch mechanisms for use with multiple unit vehicles such as potato planters and the like.

An object of this invention is to provide a novel hitch mechanism, of simple and inexpensive construction for use in effectively releasably interconnecting a pair of outboard single-wheeled vehicles, such as potato planters, in side-by-side relation with a wheeled apparatus such as a double unit potato planter so that said vehicles may be drawn by single prime movers.

Another object of this invention is the provision of a novel and improved hitch mechanism for use in interconnecting a plurality of vehicles, such as potato planters, in side-by-side relation to permit towing of the vehicles by a prime mover, the hitch mechanism being arranged and constructed to allow limited floating action of the centrally located vehicle while permitting the outboard units to be pivoted rearwardly for providing general accessability to the working parts of all of the vehicle.

A further object of this invention is the provision of a novel and improved hitch mechanism for use in interconnecting in side-by-side closely-coupled relationship a plurality of vehicles such as potato planters and the like, so that the interconnected vehicles may be towed as a unit by a tractor, the hitch mechanism being arranged and constructed with provision for limited floating movement of the centrally located vehicle to permit the centrally located vehicle to follow the contour of the ground, the outboard units being rigidly interconnected for bearing most of the weight of the hitch mechanism so that the aligned vehicles such as potato planters can be operated at a high degree of efficiency.

Another object of this invention is the provision of a novel and improved hitch mechanism for use in interconnecting a plurality of vehicles, such as potato planters, in side-by-side relation to permit towing of the vehicles by a prime mover, the hitch mechanism being arranged and constructed to allow the vehicles to be readily adjusted in a lateral direction to accommodate the various spaced relations of crop rows.

These and other objects and advantages of my invention will more fully appear from the following description made in connection with the accompanying drawings wherein like character references refer to the same or similar parts throughout the several views, and in which:

FIG. 1 is a rear elevation of my hitch mechanism shown in interconnecting relation with a plurality of vehicles including a conventional double-unit potato planter and a pair of outboard single units, the bin and planting mechanism being deleted from two of the units to better show the hitch mechanism;

FIG. 2 is a top elevational view of my hitch mechanism with certain portions thereof indicated in adjusted position by dotted line configuration; and FIG. 3 is a side elevational view of my hitch mechanism.

Referring now to the drawings, it will be seen that my hitch mechanism designated in its entirety by the reference numeral 8 is shown interconnecting the vehicle illustrated herein as a double unit potato planter 9 and a pair of outboard single-wheeled potato planting units 10 and 11 respectively. The double unit 9 is comprised of a pair of single-wheeled potato planting units 9a and 9b of substantially identical construction with respect to each other and the outboard units 10 and 11.

The units 9a and 9b are mounted for lateral adjustment upon a drawbar 12 having secured thereto lateral brackets 13 at the forwardmost end and 14 at the rear. The unit 9a has a shaft 16 journaled to its frame 15 which extends outwardly to the left and has at its outwardly extending portion a wheel 17 preferably of the rubber type variety.

In a similar manner and similar to my Patent No. 2,710,200, the potato planter unit 9b has a frame 18 adjustably secured to brackets 13 and 14 and has journaled thereto a shaft 19 which extends to the right thereof, as viewed in FIG. 2. The shaft 19 has a wheel 20 similar to the wheel 17 of the unit 9a. It may thus be seen that the units 9a and 9b are identical except for the reversal of the parts as shown. The various parts of the potato planting mechanism which constitutes no part of the present invention is old and well known in the art and the potato planting mechanism is mounted upon each of the units through its respective plan. Generally, the parts of the potato planter are the seed potato bin 22, the fertilizer bin 22a, a pair of opening gangs 23, a pair of closing gangs 24 and a lever mechanism for adjusting the operation thereof during forward travel.

The operation of the potato planting units is such that during forward travel of the units the opening gangs 23 divide the earth into a trench along the bottom of which seed potatoes are spaced by the planting mechanism, following which the closing gangs cover and hill the planted potatoes. Units 9a and 9b are adjustable laterally upon the brackets 13 and 14 so as to vary the width between the planted rows according to the desires of the operator. To this end it is pointed out that each end of bracket 13 has a plurality of longitudinally spaced apertures therein and that each end of bracket 14 also has a plurality of apertures therein. Each of the front and rear portions of unit 9a has a pair of apertures therein and each of the front and rear portions of the unit 9b also has a pair of apertures therein. The bracket 13 may be positioned so that selected of the apertures in each end thereof are disposed in registering relation with the apertures in the front portions respectively of the units 9a and 9b. The rear bracket 14 will be similarly positioned with respect to the rear portion of the units 9a and 9b. Bolts 13a secure the bracket 13 to units 9a and 9b while bolts 14a secure bracket 14 to units 9a and 9b. Thus it will be seen that brackets 13 and 14 may be variously positioned with regard to units 9a and 9b to selectively vary the width therebetween.

The outboard unit 10 is identical in construction to the unit 9a while the outboard unit 11 is substantially identical to the planter unit 9b. The outboard units 10 and 11 are interconnected to the double unit 9 by means of my novel hitch mechanism 8 and my hitch mechanism 8 permits the double planter to be expanded into a multiple planter in the manner of my co-pending patent No. 2,710,200. The novel hitch mechanism shown herein permits the weight of the hitch mechanism to be borne generally by the outboard units while leaving the double unit somewhat free to follow the contours of the ground by the limited pivotal action of the inboard or double unit.

It will be noted that the outboard unit 10 includes a frame 26 while the outboard unit 11 is provided with a frame 27 of similar construction. The outboard unit 10 is also provided with a wheel 28 while the outboard unit 11 is provided with a ground-engaging wheel 29 and these outboard units are so interconnected by my novel hitch mechanism so as to make a cooperating structure having an improved function over any heretofore known comparable structures.

The hitch mechanism interconnects the outboard units with the double planter unit and includes an elongate transversely extending stabilizing bar 30 which may be of conventional channel structure. This stabilizing bar in the embodiment shown is preferably constructed of a strong metallic material such as steel and it will be noted that the stabilizing bar is of a length substantially equating the length of the combined widths of the double potato planting unit 9 and the single units 10 and 11 respectively. The terminal portions of the stabilizing bar 30 are provided with a pair of hinge mechanisms 31 each including a pair of hinge plates 32; the plates 32 for each hinge mechanism are clamped against the upper and lower surfaces of stabilizing bar 30 by means of bolts 32a. Each hinge mechanism is also provided with a hinge or pivot pin 33 extending between its associated plates but positioned forwardly of the bar 30 so that each outboard unit is pivotal about a substantially vertical axis. Thus it will be seen that the stabilizer bar 30 is supported solely by the outboard units. It is also pointed out that the hinge mechanism 31 may be adjusted longitudinally of the stabilizer bar 30. This is accomplished by loosening bolts 32a of each hinge unit and sliding the hinge mechanism 31 along the bar 30 to the desired position and thereafter tightening the bolts.

It will be seen from FIG. 2 that these outboard units may be pivoted to a lateral out-of-the-way position to permit ready access to the working parts of the innermost units 9.

In order to prevent accidental pivoting of the outboard units 10 and 11, these units are each provided with a readily releasable locking means for releasably interlocking the units in an operative position with respect to the stabilizing bar 30. Each of these locking means 34 includes a U-shaped frame 35 including rearwardly projecting ears 35a. Each U-shaped frame 35 is rigidly connected to its associated outboard unit by an L-shaped bracket 36b. It will be noted that each of the L-shaped brackets 36b is connected to the bight portion of its associated U-shaped frame 35. The ears 35a are vertically spaced apart a distance to substantially embrace the stabilizing bar 30 and a locking pin 36 is removably positioned within suitable apertures formed in the ears 35a.

The ears 35a of each locking means are interconnected at their rear terminal portions by a retaining pin hole 36b. This hole allows a pin 36 to be positioned therein to thereby permit limited swinging movement of its associated outboard unit but maintains the unit in a position when pivoted to an out-of-the-way position to thereafter be readily and quickly shifted again into axial alignment with the other units.

My novel hitch mechanism 8 also includes brace members 37 which, as best seen in FIG. 2, are substantially identical in construction except that one of the brace members interconnects the outboard single-wheeled unit 10 with the drawbar 12 while the other of the grace members interconnects the outboard unit 11 with the drawbar 12. Inasmuch as the brace members are of substantially identical construction but for the reversal of the parts, it is deemed that description of one is sufficient for the purposes of the present invention.

Each of the brace members 37 is of elongate preferably tubular construction and each is provided with an elongate brace element 38 rigidly interconnected to its rearmost end as by welding. These brace elements 38 are disposed in angulated relation with its associated brace member 37 and each brace element 38 cooperates with a reinforcing bar 39 to define a substantially triangular shaped connecting portion.

Referring again to FIGS. 2 and 3 it will be seen that the outboard units 10 and 11 are each provided with attachment brackets 40 adjacent opposite side portions thereof which project forwardly therefrom. These attachment brackets 40 each include a pair of ears 40a vertically spaced apart and suitably apertured for releasably receiving locking pins 41 therethrough. The brace elements 38 are embraced by and cooperate with the brackets and pins 40 and 41 respectively to define a quick detachable coupling for interconnecting the entire front portion of the outboard units with the brace members 37. This triangular construction of the connecting ends of the brace members permits an evenly distributed towing effect to be exerted on the outboard planting units by means of the brace members 37.

It will also be noted that the construction of brackets 40 and their locked relation with the brace members 38 permit the outboard units to be adjusted laterally on the brace members. This may be accomplished by loosening pins 41 and adjusting the outboard units relative to the brace members 38. It will be noted that the outboard units may also be initially adjusted relative to the bar 30. This permits the planter units to be readily adjusted to conform to the various spaced relations of crop rows.

Each of the brace members 37 converge from their respective attachments to the outboard units for connection of the drawbar 12 in a manner similar to that set forth in my earlier Patent No. 2,710,200. In this connection, it will be seen that the forwardly extending end of each of the connectors or brace members 37 has a detachable pivotal connection 42 to a cross strut 43 attached to the forward terminal portion of drawbar 12. The connection 42 may be accomplished by removable pin 44 extending through openings in the strut 43 and the end of the brace members 37. The forwardmost end of the drawbar terminates in a hitch 12a for attachment to the rear of a vehicle such as a tractor.

In order to coordinate movement of the double unit 9 with respect to the outer units 10 and 11, it will be noted that these outboard units 10 and 11 are interconnected to the double unit 9 by means of a pair links. The link 46 interconnects the unit 9a with the outboard unit 10 while a link 47 interconnects the inboard unit 9b with the outboard unit 11. Opposite ends of link 46 are angularly bent as at 46a and these ends project through apertures formed in the rear portions respectively of outboard unit 10 and unit 9a. Similarly, the opposite ends of link 47 are angularly bent as at 47a and these ends project through apertures formed in the rear portions respectively of outboard unit 11 and unit 9b. In this connection, it will be noted that links 46 and 47 permit relative pivoting movement between the unit 9a and the unit 10 about substantially horizontally disposed longitudinal axis and similarly, unit 9b and unit 11 are interconnected for pivoting about a longitudinal axis. It is also pointed out that the outboard units 10 and 11 are interconnected at their respectively forwardmost pivots through the brace members 37 so that there may be relative movement between the double unit 9 and the outboard units in an upwardly and downwardly manner. This particular arrangement permits a floating action of the double unit 9. More specifically, the outboard units are interconnected to the units 9a and 9b by the links 46 and 47 and by the pivot pins 44. The respective lengths of the braces 37 and the drawbar 12 in addition to the loose pivotal connections at 44 allows relative vertical shifting between the outboard units and the units 9a and 9b.

It is pointed out that the outboard units may be adjusted laterally to conform to spacing of the rows to be planted. This is possible, as pointed out above, because of the unique manner in which the outboard units are coupled to the bar 30 and the brace member 38.

In operation, the multiple unit potato planter will be towed by a tractor or other prime mover and, of course, the units will function in the usual manner of conventional potato planters. However, when it is desired to repair a portion of the entire multiple unit potato planter such as, for example, the tires of the double unit 9, the repair may be accomplished even though the outboard units and inboard units are filled respectively with seed potatoes and fertilizers and may be accomplished even though the multiple potato unit is in operation in the field.

This repair may be achieved by a simple, expedient of removing pivot pin 44 from either of the outboard unit brace members 37 and also removing the lock retaining pin 36a of the associated outboard unit. Thereafter, the outboard unit so disconnected may be swung laterally to the position as illustrated in FIG. 2 by dotted line configuration. This position permits ready access to one side of one of the inboard units while the other outboard unit may be similarly moved.

The inboard units may be readily adjusted laterally by means of their coupled relation with brackets 13 and 14.

It will be seen that the stabilizing bar of the invention herein described permits the outboard units to be interconnected and it will be noted that the outboard units are so interconnected to the stabilizing bar 30 that most of the weight of the hitch mechanism 8 is borne by these outboard units. This is extremely important during operation of the multiple unit potato planter since the inboard units are left free to float slightly because of their loose pivotal connection at the forwardmost end with respect to the outboard unit and the double unit 9 may as a generally follow the contours of the land. With this arrangement, there is no tendency of the ground engaging wheels to dig into the soil during operation of the unit.

The particular construction of the brace members 37 also permits even distribution and pulling effect of the prime mover to be transmitted through the elongate brace member also insuring a smooth, effective operation. A quick detachable connection at the forwardmost ends of brace members 37 along with the detachable lock means releasably interlocking the outboard units against pivoting movement relative to the bar 30 also insures smooth and effective operation of a multiple unit potato planter apparatus while also insuring ready accessability to any given unit for the purposes of repairs.

Thus, it will be seen that I have provided a novel and improved hitch mechanism for interconnecting a plurality of vehicles in side-by-side close-coupled relation such as potato planters so that a multiple unit potato planting apparatus can be produced from a conventional single unit type potato planter.

It will also be seen from the foregoing description that my novel hitch mechanism evenly and effectively distributes the weight of the hitch mechanism to the outermost units where it is most desirable to have such weight borne, thus insuring more efficient operation of the multiple unit planter apparatus.

It will, therefore, be seen from the foregoing description that I have provided a novel hitch mechanism for interconnecting a plurality of potato planters and the like in side-by-side relation for towing by a prime mover and which while being of simple and inexpensive construction functions in a more efficient manner than any heretofore known comparable constructions.

It will, of course, be understood that various changes may be made in the form, details, arrangement and proportions of the various parts without departing from the scope of my invention.

What is claimed is:

1. A hitch mechanism for interconnecting a pair of single-wheeled outboard units such as single unit potato planters, to opposite sides for travel in side-by-side and close-coupled alignment with a wheeled apparatus, such as a double unit potato planter, having supporting wheels at the sides thereof and a medially disposed drawbar extending forwardly for attachment to a vehicle such as the tractor, said hitch mechanism comprising an elongate rigid stabilizing bar positioned rearwardly of and extending transversely of the outboard units and the wheeled apparatus, said stabilizing bar having opposite end portions terminating closely adjacent the outermost sides of the single-wheeled outboard units, means for pivotally connecting said opposite end portions of the stabilizer bar to the single-wheeled units adjacent their respective outermost sides to permit lateral swinging movement of the single-wheeled units about substantially vertical axes, a pair of brace members each having means for rigid connection with the front portion of one of the outboard units and extending forwardly and inwardly therefrom towards the drawbar for releasable connection thereto at a point forwardly of the attachment of the drawbar to the wheeled apparatus, said releasable connections permitting limited relative vertical movement between the wheeled apparatus and the outboard units, and said braces cooperating with said stabilizing bar for rigidly interconnecting the outboard units but permitting limited floating action of the wheeled apparatus whereby the latter may follow the contour of the ground.

2. A hitch mechanism for interconnecting a pair of single-wheeled outboard units, such as single unit potato planters, to opposite sides for travel in side-by-side and close coupled alignment with a wheeled apparatus, such as a double unit potato planter, having supporting wheels at the sides thereof and a medially disposed drawbar extending forwardly for attachment to a vehicle such as a tractor, said hitch mechanism including an elongate rigid stabilizing bar positioned rearwardly of and extending transversely of the outboard units and the wheeled apparatus, said stabilizing bar having opposite end portions terminating closely adjacent the outermost sides of the single-wheeled outboard units, means for pivotally connecting said opposite end portions of the stabilizer bar to the single-wheeled units adjacent their respective outermost sides to permit lateral swinging movement of the single-wheeled units about substantially vertical axes, ready releasable lock means releasably interlocking the single wheeled units to its associated end portion of the stabilizing bar for preventing pivotal movement of the former, a pair of brace members each having means for rigidly connecting with the front portion of one of the outboard units and extending forwardly and inwardly therefrom towards the drawbar for releasable connection thereto at a point forwardly of the attachment of the drawbar to the wheeled apparatus, said releasable connections permitting limited relative vertical movement between the wheeled apparatus and the outboard units, and said braces cooperating with said stabilizing bar for rigidly interconnecting the outboard units by permitting limited floating action of the wheeled apparatus whereby the latter may follow the contour of the ground.

3. The structure as defined in claim 2 wherein each of the brace members is provided with an elongate rigid transverse brace element affixed to the rear end portion thereof and in angulated relation therewith, and means for attaching each of the brace elements to its associated single-wheeled unit for ready detachment therefrom.

4. A hitch mechanism for interconnecting a pair of single-wheeled outboard units, such as single unit potato planters, to opposite sides of travel in side-by-side and close-coupled alignment with a wheeled apparatus, such as a double unit potato planter, having supporting wheels at the sides thereof and a medially disposed drawbar extending forwardly for attachment to a vehicle such as a tractor, a pair of link members each extending between and being pivotally connected at opposite ends thereof to the rear wall portion of one of the single wheeled units and the rear wall portion of the wheeled apparatus to permit relative pivotal movement between the outboard units and the wheeled apparatus about substantially horizontally disposed longitudinal axes, said hitch mechanism comprising an elongate rigid stabilizing bar positioned rearwardly of and extending transversely of the outboard units and the wheeled apparatus, said stabilizing bar having opposite end portions terminating closely adjacent the outermost sides of the single-wheeled outboard unit, means carried by opposite end portions of said stabilizing bar and defining hinge connections between the bar and the single-wheeled units to permit lateral swinging movement of the latter about substantially vertical axes from a position of alignment with the wheeled apparatus to a position rearwardly of a stabilizing bar, a pair of elongate brace members for interconnecting single wheeled units to the drawbar, said brace members each having an elongate transversely extending brace element affixed to one end thereof in angulated relation therewith, means for rigidly connecting each of the brace elements with the front wall of its associated single-wheeled units for ready detachment therefrom, and said brace members converging forwardly towards said drawbar for releasable connection thereto a point forwardly of an attachment of the drawbar to the wheeled apparatus, the releasable connection permitting limited vertical movement of the wheeled apparatus with respect to the single-wheeled units whereby said single-wheeled units may have their respective brace members disconnected from the drawbar and may thereafter be pivotally swung about its pivotal connection with the stabilizing bar to thereby permit ready access to the wheeled apparatus.

5. The structure as defined in claim 4 and releasable lock means releasably interlocking the single-wheeled units to its associated end portion of the stabilizing bar for preventing accidental pivotal movement of the single-wheeled units.

6. The structure as defined in claim 4 wherein said hinge connections for each outboard unit are adjustable longitudinally of the stabilizing bar and wherein said connecting means for connecting said outboard units to said brace element are adjustable longitudinally of the latter whereby said outboard units may be readily adjusted in a lateral direction for accommodating spacing of crop rows.

References Cited in the file of this patent

UNITED STATES PATENTS 2,710,200     French  ---------------- June 7, 1955